United States Patent [19]

Takahara et al.

[11] Patent Number: 5,251,507
[45] Date of Patent: Oct. 12, 1993

[54] NON-CIRCULAR GEAR PAIR

[75] Inventors: Toshiyuki Takahara; Akira Takami, both of Hyogo, Japan

[73] Assignee: Mitsubishi Denki K.K., Tokyo, Japan

[21] Appl. No.: 503,024

[22] Filed: Mar. 30, 1990

[30] Foreign Application Priority Data

Apr. 11, 1989 [JP] Japan .................................. 1-92543

[51] Int. Cl.$^5$ ............................................. F16H 35/17
[52] U.S. Cl. ........................................ 74/557; 74/437; 475/16
[58] Field of Search ................... 475/16, 17, 904, 438; 74/393, 422, 462, 606 R, 437

[56] References Cited

U.S. PATENT DOCUMENTS

| | | | |
|---|---|---|---|
| 2,239,313 | 4/1941 | Beschkine | 74/437 |
| 3,919,895 | 11/1975 | Kerr | 74/394 |
| 4,036,073 | 7/1977 | Kitano | 74/437 |
| 4,685,348 | 8/1987 | Takami | 74/437 |
| 4,765,195 | 8/1988 | Takami | 74/437 X |
| 4,944,718 | 7/1990 | Takahara et al. | 475/16 |

FOREIGN PATENT DOCUMENTS

| | | | |
|---|---|---|---|
| 1066766 | 10/1959 | Fed. Rep. of Germany | 74/437 |
| 61-266866 | 11/1986 | Japan | 74/437 |
| 797908 | 7/1958 | United Kingdom | 74/437 |

Primary Examiner—Vinh T. Luong
Attorney, Agent, or Firm—Sughrue, Mion, Zinn, Macpeak & Seas

[57] ABSTRACT

In a non-circular gear pair comprising two non-circular gears maintained engaged, those gears have first and second intermeshing rotation parts in such a manner that the first intermeshing rotation part forms an intermeshing pitch curve with which the speed of rotation is given to one of the two gears which changes exponentially with respect to the speed of rotation of the other non-circular gear, and the second intermeshing rotation part is extended between the start and en-d points of the first intermeshing rotation part so as to form an intermeshing pitch curve with which the rotation speed ratio and the angular acceleration ratio change continuously, whereby the rotation speed and the angular acceleration change continuously throughout the first and second intermeshing rotation parts including the connecting points thereof.

4 Claims, 4 Drawing Sheets

ANGULAR DISPLACEMENT OF FIRST NON-CIRCULAR GEAR $\theta$ (rad)

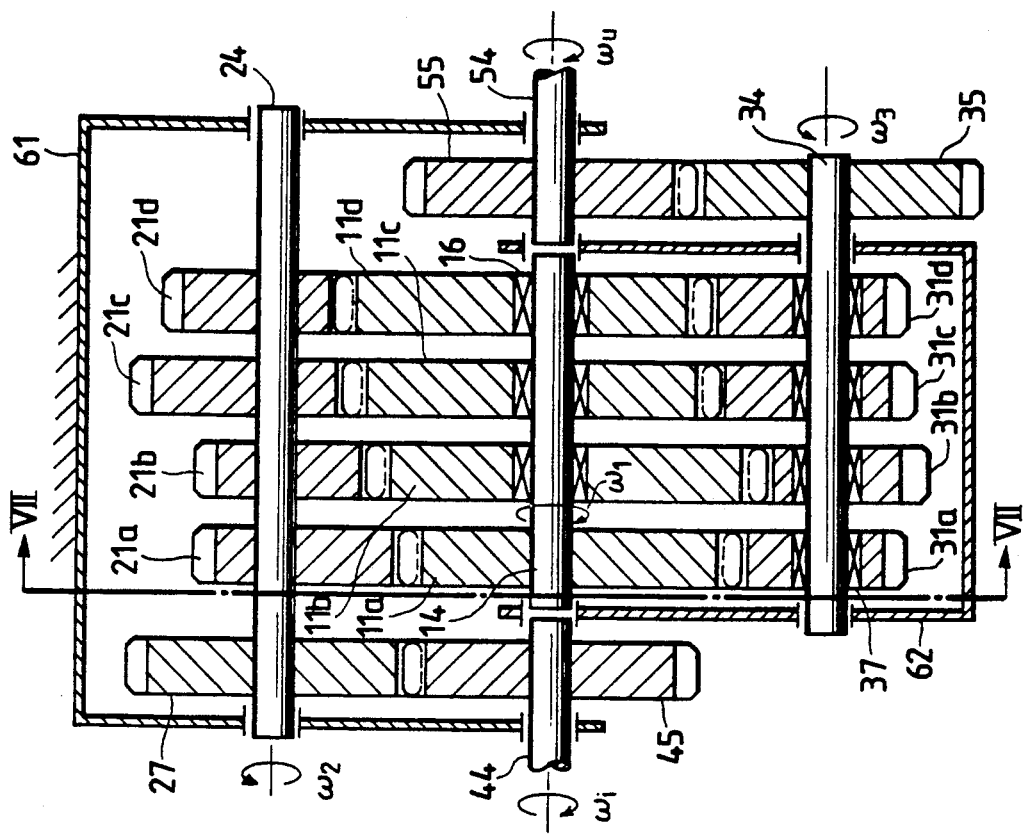
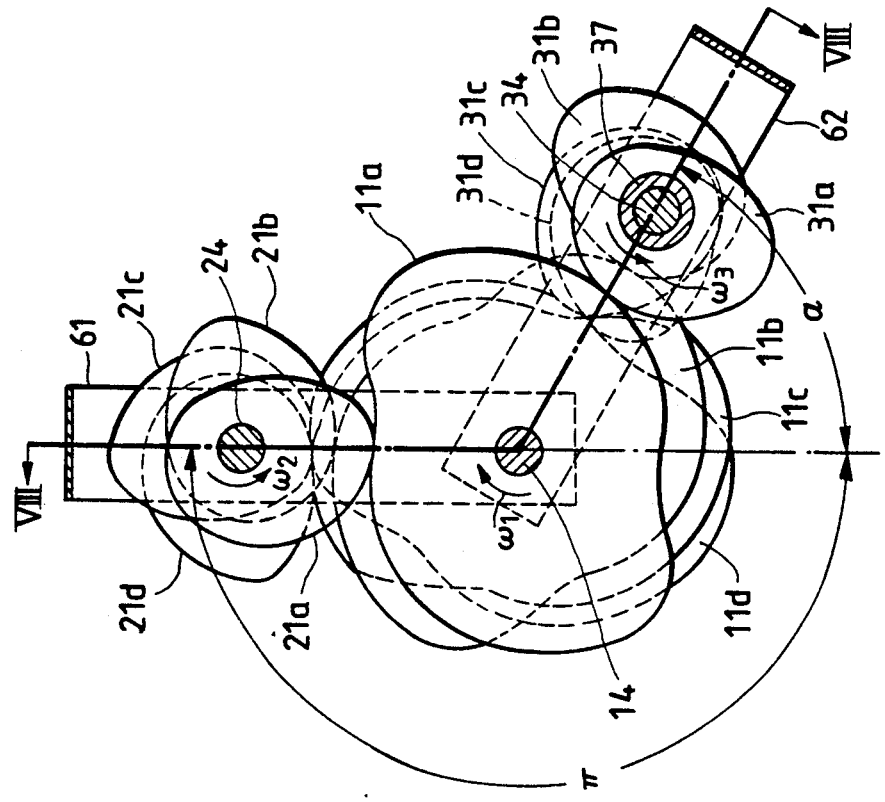

NON-CIRCULAR GEAR PAIR

BACKGROUND OF THE INVENTION

1. Field of the Invention

This invention relates to a non-circular gear pair applicable to a non-step variable speed gear in a power transmission gear device.

2. Description of the Prior Art

One example of a non-circular gear pair applicable to a non-step variable speed gear has been disclosed by Japanese Patent Application (OPI) No. 266866/1986 (the term "OPI" as used herein means an "unexamined published application") which has been filed by the present applicant. The non-circular gear pair has intermeshing pitch curves which include a part which has a positive constant value K which is defined as follows, and a part which has a negative constant K:

$$K = d \log F(\theta)/d\theta$$

where $\theta$ is the angular displacement of one of two engaged non-circular gears forming the non-circular gear pair, and $F(\theta)$ is the rotation speed ratio of the two gears. And it has disclosed a non-step variable speed gear as its application which is formed by using gear units each comprising three or four of such non-circular gears.

In the above-described conventional non-circular gear pair, the part of positive constant value K and the par of negative constant value K are successively provided on the intermeshing pitch curves. Therefore, the intermeshing pitch curves have a point where the rotation speed ratio $(\theta)$ cannot be differentiated, that is, the angular acceleration ratio changes discontinuously. When the gears are intermeshed at this point, an inertial force is abruptly produced in the variable speed gear, so that the latter is vibrated with the result that its efficiency is lowered.

SUMMARY OF THE INVENTION

Accordingly, an object of this invention is to eliminate the above-described difficulties accompanying a conventional non- circular gear pair.

More specifically, an object of this invention is to provide a non-circular gear pair which is used for the provision of a non- step variable speed gear which has less in vibration and is higher in efficiency than a conventional non-step variable speed gear. The foregoing object and other objects of the invention have been achieved by the provision of a non-circular gear pair comprising a first non-circular gear fixedly mounted on a first rotary shaft and a second non-circular gear fixedly mounted on a second rotary shaft and engaged with the first non-circular gear, the gears being continuously rotated to transmit torque while being intermeshed with each other, in which the first and second non-circular gears are shaped as follows:

at least a first intermeshing rotation part which, when the absolute value $|\omega_2/\omega_1|$ of a ratio of a rotation speed $\omega_2$ of the second non-circular gear to a rotation speed $\omega_1$ of the first non-circular gear is represented by $F(\theta)$ which is a function of an angular displacement $\theta$ of the first non-circular gear, allows $K = d \log F(\theta)/d\theta$ which is a differential equation involving the angular displacement $\theta$ to be constant, and a second intermeshing rotation part extended between the start and end points of the first intermeshing rotation part so as to form a closed loop with the first intermeshing rotation part, the second intermeshing rotation part being provided as many as the first intermeshing rotation part, form the intermeshing pitch curves of the first and second non-circular gears, and throughout the first and second intermeshing rotation parts including the connecting points thereof, the value of the function $F(\theta)$ and a differential value $d F(\theta)/d\theta$ of $F(\theta)$ with respect to $\theta$ change continuously. With the non-circular gear pair according to the invention the speed of rotation of one of the non-circular gears with respect to the speed of rotation of the other changes exponentially with respect to the angle of rotation when the two gears are intermeshed with each other at the first intermeshing rotation part. When the gears are intermeshed at the second intermeshing rotation part, the rotation speed ratio and the angular acceleration ratio change smoothly throughout the intermeshing rotation part including the connecting points thereof.

For instance when, in each of two non-circular gear pairs of the invention, the gears are intermeshed with each other at the part where the speed of rotation changes exponetially one of the gear pairs converts a constant speed of rotation into a speed of rotation which changes exponentially, while the other converts the latter speed of rotation into another constant speed of rotation again. Application of this action can provide a non-step variable speed gear device. In this case, the speed of rotation and the angular acceleration speed of each of the gear units change continuously at all times even when the non-circular gears are intermeshed at the connecting points of the first and second intermeshing rotation parts, whereby the device is free from the difficulty that an inertial force occurs abruptly in it.

The nature, principle and utility of the invention will become more apparent from the following detailed description when read in conjunction with the accompanying drawings, in which like parts are designated by like reference numerals or characters.

BRIEF DESCRIPTION OF THE DRAWINGS

In accompanying drawings:

FIGS. 7 and 8 shows a non-step variable speed gear according to a third embodiment which is an application of the non-circular gear pair of the invention. More specifically, FIG. 7 is a sectional view taken along line VII—VII in FIG. 8, and FIG. 8 is a sectional view taken along line VIII—VIII in FIG. 7;

DETAILED DESCRIPTION OF THE PREFERRED EMBODIMENTS

Preferred embodiments of this invention will be described with reference to the accompanying drawings.

Figure 1:
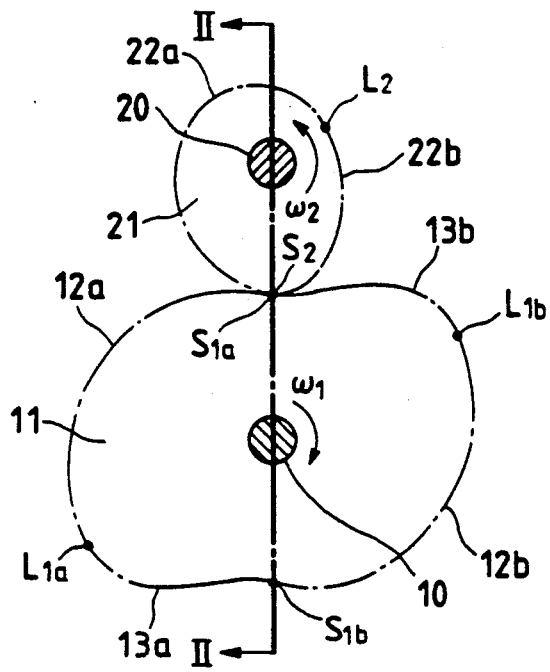
FIG. 1 is a front view showing one embodiment of a non-circular gear pair according to this invention.
Figure 2:
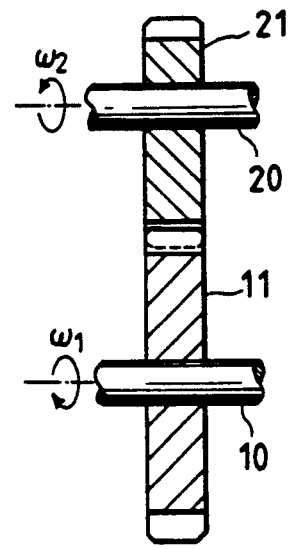
FIG. 2 is a sectional view taken along line II—II in FIG. 1.

A first example of the invention, a non-circular gear pair, is as shown in FIGS. 1 and 2.

In these FIGURES, reference numeral 11 designates a first non-circular gear fixedly mounted on a rotary shaft 10. A second non-circular gear 21 is fixedly mounted on a rotary shaft 20. The reference numerals 12a, 13a, 12b and 13b, intermeshing pitch curves of the first non-circular gear 11. The curve 12a is extended from the point $S_{1a}$ to the point $L_{1a}$, the curve 13a is extended from the same point $L_{1a}$ to the point $S_{1b}$. The curve 12b is extended from the point $S_{1a}$ to the point $L_{1b}$, and the curve 13b is extended from the point $L_{1b}$ to the point S. The curve 12b is similar in configuration to the curve 12a, and the curve 13b is similar in configuration to the curve 13a, and the same configuration occurs every central angle of $\pi$ radian. In FIG. 1, reference characters 22a and 22b designate the intermeshing pitch curves of the second non-circular gear 21. The curve 22a is extended from the point $S_2$ to the point $L_2$, and the curve 22b is extended from the point $L_2$ to the point $S_2$. The length of the intermeshing pitch curves 12a (or 12b) and 22 is equal to each other, and those of the intermeshing pitch curve 13a (or 13b) and 22b is equal to each other. Thus, the number of teeth of the first non-circular gear 11 is twice as large as that of teeth of the second non-circular gear 21.

In practice, for instance involute gear teeth are formed along the intermeshing pitch curves. However, such gear teeth will not be indicated in the drawings because the speed of rotation or the torque of transmission thereof can be satisfactorily described with reference mainly to the intermeshing pitch curves.

Figure 3:
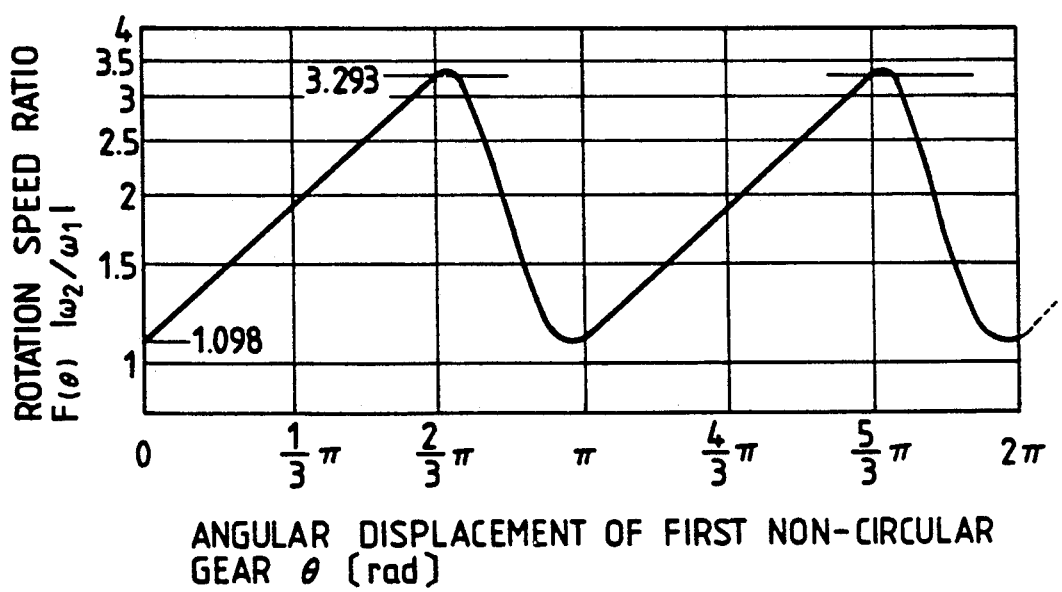
FIG. 3 is a graphical representation indicating rotation speed ratios of first and second non-circular gears forming the non-circular gear pair with angular displacement of the first non-circular gears.

The important specific feature of the non-circular gear pair thus constructed according to the invention resides in the speed of rotation as described below: FIG. 3 is a graphical representation indicating relationships between the speed of rotation of the first non-circular gear 11 and that of the second non-circular gear 21. In FIG. 3, the horizontal axis represents the angular displacement $\theta$ of the first non-circular gear 11 from 0 to $2\pi$ radians (one revolution), and the 0 radian corresponds to the state that the intermeshing point is $S_{1a}$ and $S_2$; and the vertical axis is a logarithmic scale indicating the ratio of the speed of rotation of the second non-circular gear 21 to the speed of rotation of the first non-circular gear 11. If the speeds of rotation of the first and second non-circular gears 11 and 21 are represented by $\omega_1$ and $\omega_2$ as functions of the angular displacement $\theta$, respectively, then $F(\theta) = |\omega_2/\omega_1|$ indicates the ratio of the speed of rotation of the second non-circular gear 21 and that of the first non-circular gear 11.

In FIG. 3, the straight line rising to the right in a range from 0 rad. to $(\frac{2}{3})\pi$ rad. corresponds to the operation that the first non-circular gear 11 held as shown in FIG. 1 rotates through $(\frac{2}{3})\pi$ radian, so that its intermeshing point with the second non-circular gear 21 is changed from the points $S_{1a}$ and $S_2$ to the points $L_{1a}$ and $L_2$. This part will be referred to as "a main mode part". The curve extended from the straight line in a range from $(\frac{2}{3})\pi$ rad. to $\pi$ rad. corresponds to the operation that the first non-circular gear 11 rotates further through $(\frac{1}{3})\pi$ rad., so that the intermeshing point is shifted from the points $L_{1a}$ and $L_2$ to the point $S_{1b}$ and $S_2$. This part will be referred to as "a return mode part". Thus, the first non-circular gear 11 has rotated through $\pi$ rad. ($\frac{1}{2}$ revolution), while the second non-circular gear 21 has rotated through $2\pi$ rad. (one revolution). When, under this condition, the first non-circular gear 11 makes another half revolution ($\pi$ rad.), the value of $F(\pi)$ changes in the same manner, and the first and second non-circular gears are engaged again as shown in FIG. 1. As is apparent from the above description, the rotation speed ratio $F(\theta)$ changes periodically through the main mode and the return mode.

The specific feature of the main mode part resides in that the logarithmic value of $F(\theta)$ changes in linear proportion with the angular displacement $\theta$ of the first non-circular gear 11; that is, a differential value $K = d \log F(\theta)/d\theta$ is constant, for instance in the case of FIG. 3, $K = 0.52455$ radian$^{-1}$.

The return mode part is located between the main mode parts which occur periodically, so as to relay them smoothly. In FIG. 3, $\theta = (\frac{2}{3})\pi$ radian is the end point of the main mode part and the start point of the return mode part. At this point, the rotation speed ratio $F(\theta)$ of the main mode part and the return mode part are equal to each other, and the differential value $dF(\theta)/d\theta$ of the rotation speed ratio $F(\theta)$ by the angular displacement $\theta$ are equal to each other. Similarly, at $\theta = \pi$ rad. which is the end point of the return mode part and the start point of the main mode part, $F(\theta)$ and $dF(\theta)/d\theta$ is equal respectively.

Thus, in the graphical representation of FIG. 3, the curves of the return mode part are smoothly connected through the start and end points to the straight lines of the main mode part, and the rotation speed ration $F(\theta)$ changes continuously and can be differentiated throughout the main and return mode parts. In the embodiment, the intermeshing pitch curve of the return mode part of the first non-circular gear 11 is such that the radius length changes sinusoidally with the central angle. The rotation speed ratio $F(\theta)$ of the return mode part can be obtained from that intermeshing pitch curve. This can be represented algebraically as follows: It is assumed that the radius length representing the pitch curve of the return mode part of the first non-circular gear is $r(\theta)$, a function of $\theta$, then $r(\theta) = J_1 \sin(J_2 \theta + J_3) + J_4$ where $J_1$, $J_2$, $J_3$ and $J_4$ are coefficients which are so determined that the return mode pitch curve is smoothly connected to the main mode pitch curve. The intermeshing pitch curve of the second non-circular gear 21 is obtained from the configuration of the intermeshing pitch curve of the first non-circular gear 11 according to the rolling contact conditions. The rotation speed ratio $F(\theta)$ obtained from the non-circular gears having the intermeshing pitch curves thus determined changes continuously and can be differentiated in all the range of $\theta$.

A second embodiment of the invention, using the non-circular gear pair 11 and 21, will be described with reference to FIGS. 4 and 5.

In those FIGURES, reference characters 10, 11, 12a, 12b, 13a, 13b, 20, 21, 22a and 22b designate the same parts as those in FIG. 1. Further in the FIGURES, reference numeral 31 designates a third non-circular gear fixedly mounted on a third rotary shaft 30, the gear 31 being the same in configuration to the second non-circular gear 21; 32a and 32b, the intermeshing pitch curves of the third non-circular gear 31 which are the non-circular gear 21.

The third rotary shaft 30 is so positioned that it forms a central angle of $(\pi+\alpha)$rad. with the second rotary shaft 20. This arrangement is important. Since the first non-circular gear 11 shows the same configuration every central angle of $\pi$ rad., the provision of the central angle of $(\pi+\alpha)$rad. is substantially equivalent to the provision of a central angle of $\alpha$ radian. The rotation speeds $\omega_1$, $\omega_2$ and $\omega_3$ of the first, second and third non-circular gears 11, 21 and 31 are related to one another as follows:

$$\omega_2 = -\omega_1 \omega^{k\theta} F(0)$$

$$\omega_3 = -\omega_1 e^{k(\theta+\alpha)} F(0)$$

where $F(0)$ is the value of the rotation speed ratio $F(\theta)$ with $\theta=0$.

From the two equations, $$\omega_3/\omega_2 = e^{K\alpha}$$

The last equation of rotation speed ratio indicates the character which is applicable to a non-step variable speed gear which can be obtained by application of the invention. This character appears when the intermeshing of the first and second non-circular gears 11 and 21 and the intermeshing of the second and third non-circular gears 21 and 31 are effected with the main mode parts. In the other cases, a rotation speed ratio pattern appears which attributes to the rotation speed ratios of the return mode parts.

Figure 4:
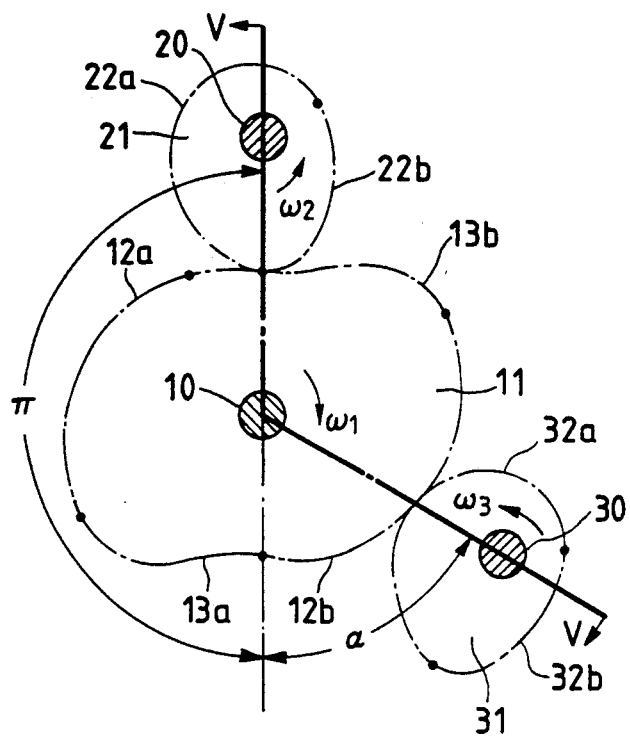
FIG. 4 is a front view showing a variable speed mechanism according to a second embodiment which is formed by using the first and second non-circular gears shown in FIG. 1 and a third non-circular gear which is the same in configuration to the second non-circular gear.
Figure 5:
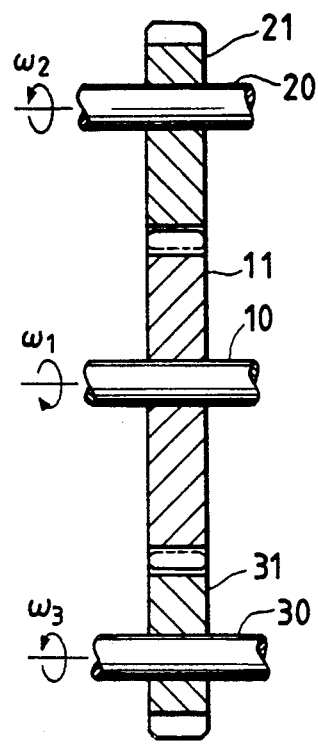
FIG. 5 is a sectional view taken along line V—V in FIG. 4.
Figure 6:
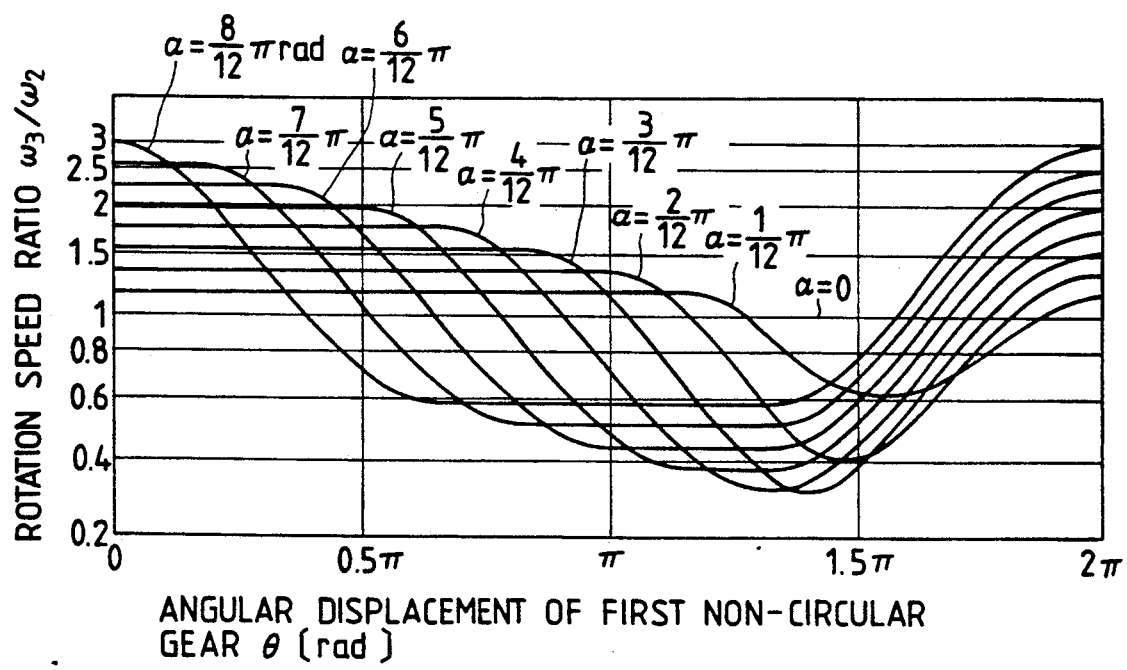
FIG. 6 is a graphical representation indicating rotation speed ratios of the second and third non-circular gears with angular displacements of the first non-circular gear.

FIG. 6 shows the variations of the rotation speed ratio of the second and third non-circular gears 21 and 31 in which case when the central angle $\alpha$ is changed which indicates the position of the third non-circular gear 31 with respect to the second non-circular gear 21 as shown in FIG. 4. More specifically FIG. 6 shows the fact that, with the application of the non-circular gear pair, the rotation speed ratio $\omega_3/\omega_2$ partialy has constant value which changes with the value $\alpha$.

A non-step variable gear using the non-circular gear pair according to the invention can be formed by using means for variably controlling the central angle $\alpha$, constant speed means for detecting a constant part of the rotation speed ratio variation pattern, and means for providing continuous intermeshing with one and the same rotation speed ratio.

A third embodiment of the invention, a non-step variable speed gear, will be described with reference to FIGS. 7 and 8.

In the embodiment, the central angle $\alpha$ is externally controlled. For constant speed, one-way clutches 37 are employed. And for continuous intermeshing, four gear units are employed which are each made up of the first, second and third non-circular gears described with reference to FIG. 4 (the second embodiment).

In FIGS. 7 and 8, reference characters 11a, 11b, 11c and 11d designate first non-circular gears, respectively. The first non-circular gear 11a is fixedly mounted on a first rotary shaft 14, and the remaining first non-circular gears 11b, 11c and 11d are rotatably mounted on the shaft 14 through bearings 16. The first non-circular gears 11a, 11b, 11c and 11d are engaged with second non-circular gears 21a, 21b, 21c and 21d and third non-circular gears 31a, 31b, 31c and 31d, respectively. Further in those FIGURES, reference numeral 44 designates a fourth rotary shaft which is an input shaft on which a circular gear 45 is fixedly mounted; 24, a second rotary shaft on which a circular gear 27 engaged with the circular gear 45 is fixedly mounted and on which the second non-circular gears. 21a, 21b, 21c and 21d are fixedly mounted at angular intervals of $\pi/2$ in the direction of rotation; 34, a third rotary shaft on which the third noncircular gears 31a, 31b, 31c and 31d are mounted respectively through one-way clutches 37; and 54, a fifth rotary shaft which is an output shaft, on which a circular gear 55 engaged with a circular gear 35 is fixedly mounted. The fourth and fifth rotary shafts 44 and 54 are supported through bearings by a stationary frame 61 in such a manner that they are in a line. The second rotary shaft 24 is also supported by the stationary frame 61 through bearings. A movable frame 62 is rotatably supported on the fourth and fifth rotary shafts 44 and 54 through bearings, and the first and third rotary shafts 14 and 34 are supported by the movable frame 62 through bearings, whereby, of the angle $(\pi+\alpha)$rad. formed by the second and third rotary shafts 24 and 34 with the common axis of the first non-circular gears 11a through 11d as the vertex, the angle $\alpha$ can be continuously changed to a desired value.

The one-way clutches 37 are so designed as to transmit torque from the third non-circular gears 31a through 31d to the third rotary shaft 34 in the direction of rotation of the arrow only.

When, in the above-described third embodiment, an input source gives a speed of rotation $\omega_i$ to the fourth rotary shaft, a speed of rotation $\omega_u$ is outputted by the fifth rotary shaft which is obtained through speed conversion in a rotation speed ratio correlated to the controllable angle $\alpha$. Since the angle $\alpha$ can be controlled steplessly, the rotation speed ratio $\omega_u/\omega_i$ is also of non-step continuous value.

Figure 9:
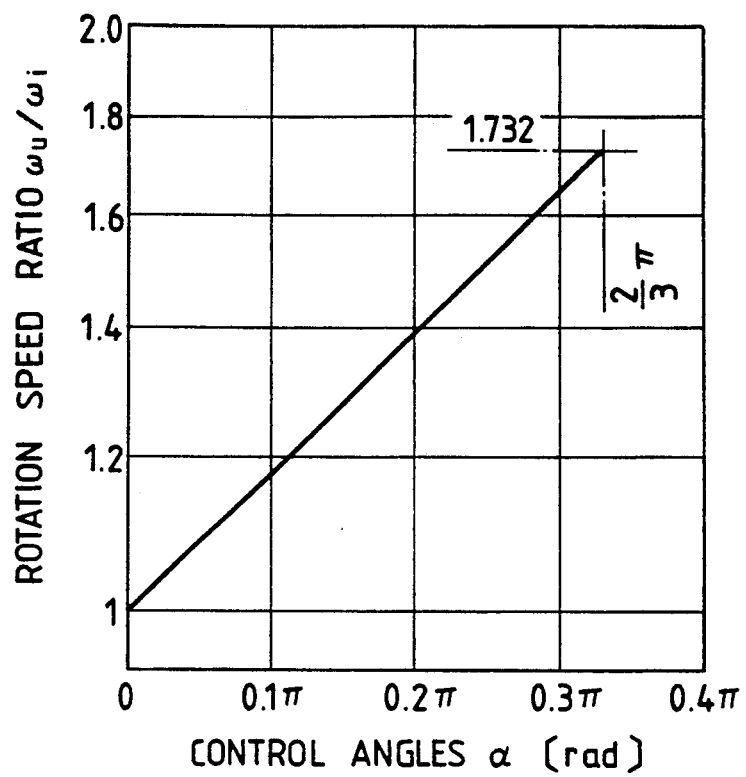
FIG. 9 is a graphical representation for a description of the operation of the non-step variable speed gear.

FIG. 9 is a graphical representation indicating control angles $\alpha$ with rotation speed ratios $\omega_u/\omega_i$.

In the above-described embodiments, the first non-circular gear has a periodic angle of $\pi$ radians, and the second non-circular gear has a periodic angle of 2° radians; however, it should be noted that the invention is not limited thereto or thereby.

Theoretically, all of the non-circular gear pairs in which the periodic angle of the first non-circular gear is given by a central angle of $2\pi/m$ rad. of the first non-circular gear (where m is a natural number) and the periodic angle of the second non-circular gear is given by a central angle of $2\pi/n$ rad. of the second non-circular gear (where n is a natural number) can be applied to a non-step variable speed gear which is an application of the non-circular gear pair according to the invention.

Figure 10:
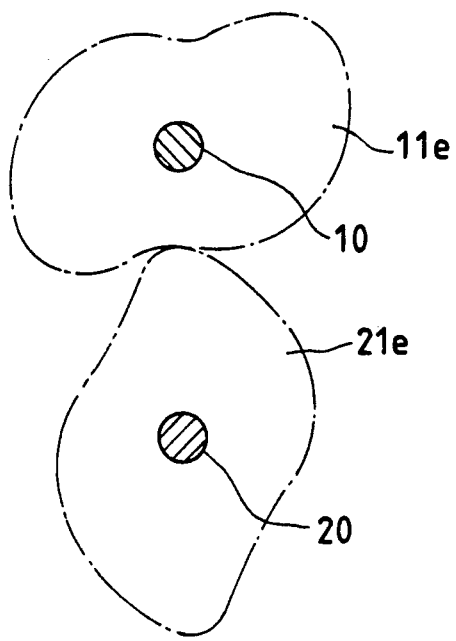
FIG. 10 is a front view showing another example of the noncircular gear pair according to the invention.

One example of the non-circular gear pair which is different in periodic angle from those which have been described above is as shown in FIG. 10. In the example, m=n=2, and when the first non-circular gear 11 turns through $\pi$ rad., the second non- circular turns the same angle.

In the above-described embodiment, the configuration of the intermeshing pitch curve of the return mode part is determined by the method in which first the intermeshing pitch curve of the return mode part of the first non-circular gear is made sinusoidal, and the configuration of the intermeshing pitch curve of the return mode part of the second non-circular gear is obtained under the condition of rolling contact that there will be no slide between the two curves. However, it goes without saying that the intermeshing pitch curve of the return mode part of the second non-circular gear may be made sinusoidal to obtain the intermeshing pitch curve of the first non-circular gear. In the invention, the method of determining the configuration of the intermeshing pitch curve of the return mode part is not always limited to those which have been described above. For instance, elliptical curves can be employed for the intermeshing pitch curves of the return mode parts of the first and second non-circular gears. If, in this case, it is possible to coincide the focal point of the ellipse with the center of rotation of the non-circular gear, then the intermeshing pitch curves of the first and second non-circular gears can be made elliptical. That is, if the curve which can always be differentiated with respect to $\theta$ and is smoothly connected to the main mode part is employed to represent the rotation speed ratio $F(\theta)$ of the return mode part, then the intermeshing pitch curve of the return mode part can be obtained from $F(\theta)$.

Effects of the Invention

As was described above, according to the invention, in the non-circular gear pair in which the logarithmic value of the rotation speed ratio changes in linear proportion to the angular displacement of the first non-circular gear, the intermeshing pitch curves are so determined that the differential value of the rotation speed ratio changes continuously. Thus, the invention can provide a non-step variable speed gear which is substantially free from the difficulty that an inertial force is produced abruptly to vibrate it. That is, the non-step variable speed gear using the non-circular gear pair of the invention is higher in efficiency than the conventional one.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A non-circular gear pair comprising a first non-circular gear fixedly mounted on a first rotary shaft and a second non-circular gear fixedly mounted on a second rotary shaft and engaged with said first non-circular gear, said fears being continuously rotated to transmit torque while being intermeshed with each other, in which said first and second non-circular gears are shaped as follows:

at least one main mode portion which, when the absolute value $|\omega_2/\omega_1|$ of a ratio of a rotational speed $\omega_2$ of said second non-circular gear to a rotational speed $\omega_1$ of said first non-circular gear is represented by $F(\theta)$ which is a function of an angular displacement $\theta$ of said first non-circular gear, allows $K = d \log F(\theta)d\theta$ which is a differential equation involving said angular displacement $\theta$ to be constant, and at least one return mode portion extending from at least one of a start point and an end point of said main mode portion, the start point of said main mode portion and an end mode portion and a start point of said return mode portion overlapping thereby to define connecting points, the number of said return mode portions being provided as many as the number of said main mode portions thereby to form the intermeshing pitch curves of said first and second non-circular gears, and throughout said main mode and return mode portions including said connecting points thereof, the value of said function $F(\theta)$ and a differential value $dF(\theta)/d\theta$ of $F(\theta)$ with respect to $\theta$ change continuously, such that at a corresponding one of said connecting points between said main mode portion and said return mode portion of each of said first and second non-circular gears, the rotational speed ratio $F(\theta)$ of said first non-circular gear to said second non-circular gear when said first and second non-circular gears are engaged at said main mode portions is equal to the ratio $F(\theta)$ when said first and second non-circular gears are engaged at said return mode portions, and such that at said corresponding one of said connecting points the differential value $dF(\theta)/d\theta$ of the rotational speed ratio $F(\theta)$ by the angular displacement $\theta$ of said first non-circular gear to said second non-circular gear when said first and second non-circular gears are engaged at said main mode portions is equal to the differential value $dF(\theta)/d\theta$ of the rotational speed ratio $F(\theta)$ when said first and second non-circular gears are engaged at said return mode portions.

2. A non-circular gear pair according to claim 1, in which the number of teeth of said first non-circular gear is twice as large as that of teeth of said second non-circular gear.

3. A non-circular gear pair according to claim 1, in which $\theta = (\frac{2}{3})\pi$ radian is the end point of said main mode portion and the start point of said return mode portion.

4. A non-circular gear pair according to claim 1, in which $\theta = \pi$ rad. is the end point of said return mode portion.

* * * * *